(No Model.)
W. BARNES & T. EDEN.
BRAKE MECHANISM.
No. 580,754.
2 Sheets—Sheet 1.
Patented Apr. 13, 1897.
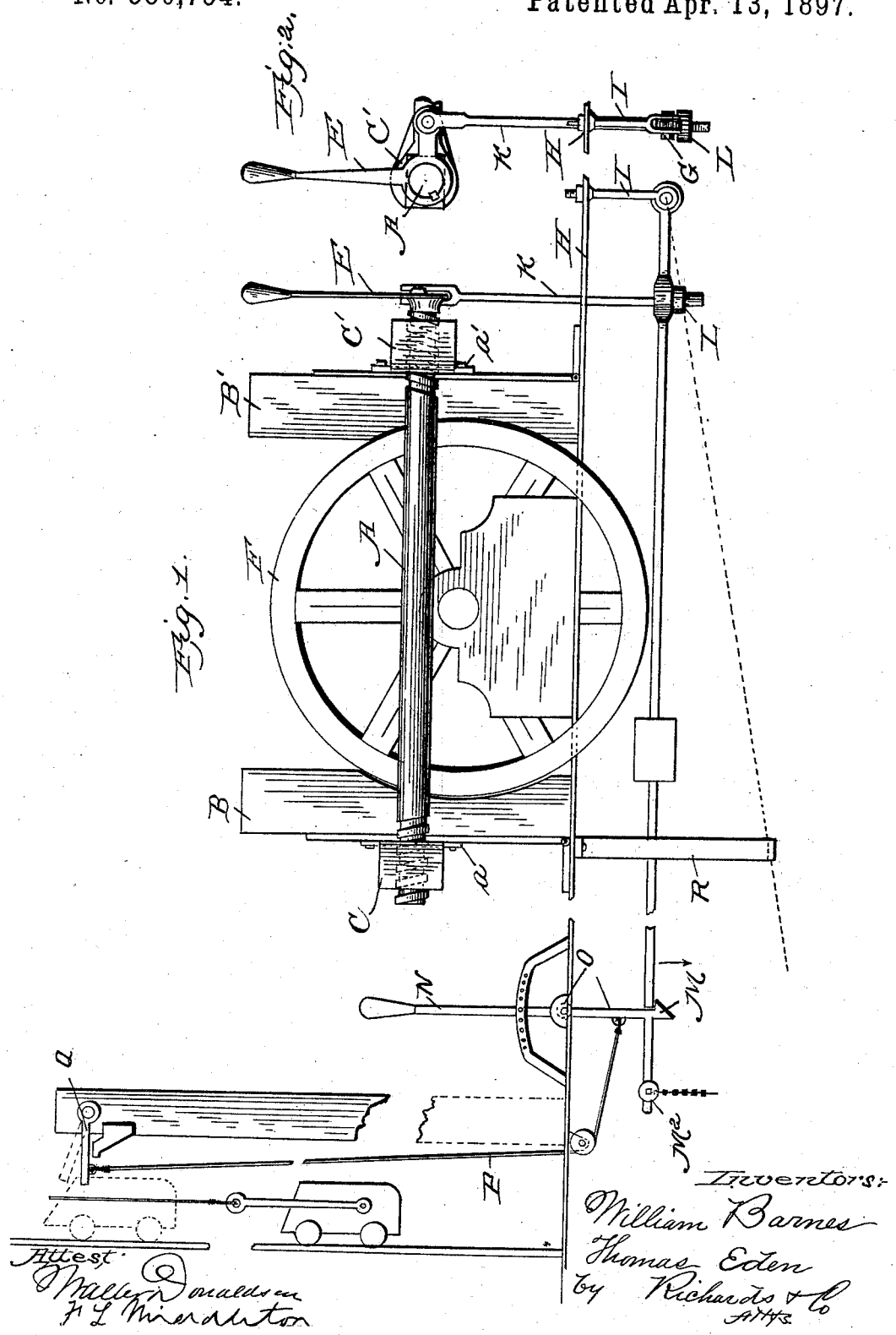
Inventors:
William Barnes
Thomas Eden
by Richards & Co
Att'ys
Attest:

(No Model.) 2 Sheets—Sheet 2.
W. BARNES & T. EDEN.
BRAKE MECHANISM.
No. 580,754. Patented Apr. 13, 1897.
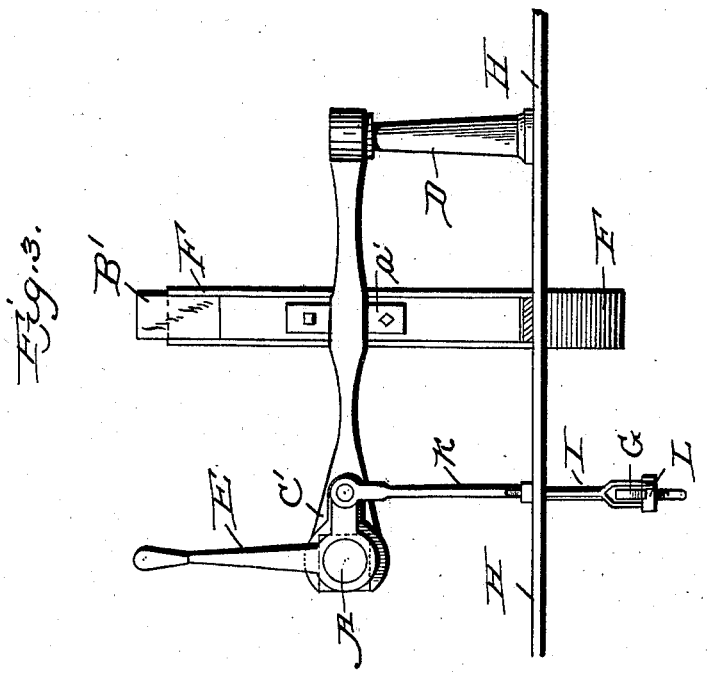

UNITED STATES PATENT OFFICE.

WILLIAM BARNES AND THOMAS EDEN, OF NEAR JOHANNESBURG, SOUTH AFRICAN REPUBLIC.

BRAKE MECHANISM.

SPECIFICATION forming part of Letters Patent No. 580,754, dated April 13, 1897.

Application filed July 21, 1896. Serial No. 600,064. (No model.)

*To all whom it may concern:*

Be it known that we, WILLIAM BARNES and THOMAS EDEN, British subjects, residing at the New Spes Bona Gold Mining Company, near Johannesburg, South African Republic, have invented a certain new and useful Brake Mechanism, of which the following is a specification.

This invention relates to the construction, adaptation, and application of an improved, more simple, and effective mechanical appliance or means for expeditiously arresting the motion of steam and other engines or motors having fly-wheels or any other wheel in motion, and in order that the carrying out of our invention in practice may be fully understood we have illustrated it on the accompanying sheet of explanatory drawings and have marked the same with letters of reference corresponding with those in the following description of our invention.

In the drawings, Figure 1 is a side view of the invention. Fig. 2 is a detail of the hand-lever and counterpoise-lever. Fig. 3 is a detail of these parts in connection with the brake-block.

In carrying out our invention we use a tightening-rod A, having a right and left hand screw, cut respectively on its ends, by means of which the upright brake-blocks B B' may be moved to or from the wheel they are to control. These brake-blocks are hinged to the floor of the engine-room or to the bed of the engine in any convenient manner. The ends of the tightening-rod pass through nuts working on loose joints in the forked ends of the two levers or arms C C', placed, respectively, on either side of the wheel to which the brake-power is to be applied. The opposite ends of these levers are hinged to fixed standards D or other suitable contrivances, whereby they may have a lateral motion from the standards as a center. These levers or arms are attached by means of suitable hinges or joints $a\ a'$ to the center of the brake-blocks B B', so that when the tightening-rod A is caused to revolve a short distance by pressing down the hand-lever E, which is fixed at any convenient point of the rod, the action of the right and left hand screws on its ends, acting on the nuts in the levers or arms C C', draws them inward toward the periphery of the wheel F, partly embraced by the brake-blocks B B', which are carried forward onto the wheel, and by the enormous pressure they exert almost instantaneously arrest its motion and stop the whole of the machinery driven or worked by the engine. The pitch of the screws may vary according to the speed of the travel required.

Our invention can also be adapted and applied to overhead winding in such manner as to prevent overwinding, the skip, when reaching a certain fixed height beyond which there is danger, causing the brake to be automatically applied and the engine stopped. In carrying out this portion of our invention we use a counterpoised lever-rod G, fixed in a pit or cavity under the flooring H of the engine-room, and which is connected by a hinged joint at the end farthest from the head-gear to an inverted standard I, bolted to the underneath side of the flooring.

The lever-rod G is loosely jointed to a connecting-rod K, which passes vertically through the floor from the hand-lever E by means of a hole at a right angle to its length, through which the end of the connecting-rod passes. A nut L, screwed onto the extremity of the latter, serves as a stop to prevent the lever-arm falling below the required distance. The counterpoised lever passes through a hanging or other conveniently-fixed guide and is supported at its outer extremity on the catch M, forming the lower end of a vertical lever N, made to swing backward and forward on a pin which passes through it at the floor-level. The under side of the catch M is beveled off to admit of the lever on being raised to automatically relock itself in position. A short lever-arm and weight $M^2$, attached to the rear of the lower end of the vertical lever N, serve to thrust the catch forward under the end of the counterpoised lever. The nut or stop L is set and fixed in such position that when the forward end of the counterpoised lever is resting on the catch the engine-driver is free to use the hand-lever E for the purpose of applying the brake to his engine without interfering with or altering the position of or releasing the counterpoised lever. An eyebolt O is forged on the lever N just above the catch M and to which one end of a light strong rope or wire is attached. The bight of the rope is then carried over a pulley on the floor or to the foot of the head-gear to the height at which it is desired that the brake shall be automatically applied, when its other end is attached to a lever Q, fixed at a right angle to the spindle with which it is connected in the head-gear, and which is so fitted that when the cage, truck, or skip, or other load being raised touches or comes in contact with the head-gear lever to which the end of the rope or wire is attached it causes such lever to be raised to such an extent that the strain on the rope or wire releases the catch M and causes the counterpoised lever G to fall from its horizontal position and to bring down the connecting-rod K, which in turn pulls forward the lever E and causes the rod A to revolve and draw the brake-blocks B B' together and to almost instantaneously stop the engine and arrest the upward motion of the load at any desired point. By these means the danger of overwinding is, in so far as it can be controlled by human foresight, absolutely prevented.

In order to set the counterpoised lever for repeated action, it is but necessary to raise it to a horizontal position by means of the lever K and to thrust forward the lever N, the catch M on the end of which then passes under and supports the end of the counterpoised lever, or, by the contrivance previously described, $M^2$; the latter may be made to automatically set or lock itself.

Having now particularly described and ascertained the nature of our said invention and in what manner the same is to be and can be applied, we here declare that we do not limit ourselves to the precise details of our invention as hereinbefore specified and as illustrated on the accompanying drawings, because equivalent modifications or variations can be made in such details and quite consistent with the principles or characteristic features of our invention, and in conclusion we declare that what we claim is—

In combination with the wheel of an engine, a pair of brakes, means for operating said brakes comprising the blocks C C' and rod A, a handle E, an angular extension projecting therefrom, a pivoted lever G, a rod K between the lever G and the extension and a catch-lever M engaging the end of the lever G, a lever Q and a connection between the catch M and lever Q, substantially as described.

In witness whereof we have hereunto set our hands in presence of two witnesses.

WILLIAM BARNES.
    THOMAS EDEN.

Witnesses:
 D. LEWIS WOOLF,
 FRED. G. MÖLLER.